United States Patent [19]

Ichibangase et al.

[11] Patent Number: 5,823,060
[45] Date of Patent: Oct. 20, 1998

[54] LEAD WIRE PROCESSING DEVICE FOR INDUSTRIAL ROBOT

[75] Inventors: Atsushi Ichibangase; Masahiro Ogawa, both of Kitakyushu, Japan

[73] Assignee: Kabushiki Kaisha Yaskawa Denki, Fukuoka, Japan

[21] Appl. No.: 687,592

[22] PCT Filed: Dec. 6, 1995

[86] PCT No.: PCT/JP95/02494

§ 371 Date: Jul. 31, 1996

§ 102(e) Date: Jul. 31, 1996

[87] PCT Pub. No.: WO96/17714

PCT Pub. Date: Jun. 13, 1996

[30] Foreign Application Priority Data

Dec. 7, 1994 [JP] Japan .................................. 6/331299

[51] Int. Cl.⁶ .................................................. B25J 11/00
[52] U.S. Cl. .......................... 74/490.02; 901/23; 901/50
[58] Field of Search ................. 901/23, 24, 50; 74/490.02

[56] References Cited

U.S. PATENT DOCUMENTS

| | | | |
|---|---|---|---|
| 4,659,279 | 4/1987 | Akeel et al. | 901/50 X |
| 4,864,888 | 9/1989 | Iwata | 901/23 |
| 4,969,795 | 11/1990 | Toyoda et al. | 901/50 X |
| 5,006,035 | 4/1991 | Nakashima et al. | 901/23 |
| 5,437,207 | 8/1995 | Zimmer | 901/50 X |

FOREIGN PATENT DOCUMENTS 60-177894  9/1985  Japan .

*Primary Examiner*—Allan D. Herrmann
*Attorney, Agent, or Firm*—Jordan and Hamburg

[57] ABSTRACT

A lead wire distribution processing structure includes separated partition plates (16) standing on the upper surface of a bottom section (12) of a swivel base (11) at a position closer to the outer periphery thereof than an arm (14) within a space (13), wherein partition plates (16) have lead wire penetration sections (17) at a level above bottom section (12), which is provided with lead wire penetration holes (18) at positions outward from partition plate (16) thereby allowing lead wires (15) drawn out of the lower section of arm (14) within space (13) to run downward and arrive at a position below lead wire penetration sections (17) of partition plates (16), thus causing them to separate from each other and extend upwardly so that they extend in opposite directions to enter the interior of a fixed base through lead wire penetration holes (18). It is possible to simply and reliably attain drip protection without any significant modifications of the swivel base in structure.

2 Claims, 1 Drawing Sheet

- 14 arm
- 11 swivel base
- 13 space
- 16 partition plate
- 17 lead wire penetration portion
- 15 lead wire
- 12 bottom portion
- 18 lead wire penetration hole

LEAD WIRE PROCESSING DEVICE FOR INDUSTRIAL ROBOT

[TECHNICAL FIELD]

The present invention relates generally to structures adapted for use in guiding and distributing processing wire leads from an arm of an industrial robot in an associative swivel base section thereof, and more particularly to lead wire guide/distribution structures for robots with enhanced drip-protection.

[TECHNICAL BACKGROUND]

One typical prior-art lead wire distribution processing device or structure for use in industrial robots is arranged as shown in FIG. 2. In FIG. 2 the numeral 1 designates a swivel base which may be swivelably or rotatably mounted on a fixed base not shown, wherein the swivel base 1 has a bottom section 2 and an interior space 3 therein. Numeral 4 indicates an arm disposed so that it is rotatably attached at its lower end to said swivel base; arm 4 comes with a plurality of lead wires 5 for drive motors for other arms and a wrist not shown, which wires are drawn out of the lower section of arm 4. The lead wires drawn from the lower section of arm 4 are guided to extend downward substantially straight toward bottom 2 and then enter the inside of the fixed base through a lead wire penetration hole 6 as formed in bottom section 2 of swivel base 1. Note in this drawing that the numeral 7 denotes a clamper for bundling lead wires 5 together, said clamper being fixed on bottom section 2.

However, the prior art lead wire guide structure is faced with the following several problems:

(1) Water put on the upper sections of arm 4 may drip down along lead wires 5 to enter the fixed base by way of lead wire penetration hole 6 of swivel base 1.

(2) Drip protection without accompanying significant changes or modifications in structure may be attained either by adding a cover that closes lead wire penetration hole 6, by adding thereto a seal made of silicon or the like, or by attaching thereto a drip-proof connector; unfortunately, it remains difficult to attain a completely sealed environment due to the fact that a plurality of lead wires must be used, affecting the outer appearance. Furthermore, the necessary assembly steps in the manufacture thereof are increased, necessitating troublesome and time-consuming disassembly in the maintenance stage.

Still further, a drip-proof connector is incapable of completely excluding water intrusion through possible gaps between lead wires and/or through gaps as defined between such lead wires and the connector. This may be avoided by bundling these lead wires together and then clamping them with the connector after insertion into a cable sheath; however, the resulting manufacture will require more steps and subsequently increase costs.

[DISCLOSURE OF THE INVENTION]

It is therefore an object of the present invention to provide a lead wire guide structure for use in industrial robots capable of simply and reliably achieving enhanced drip-proofing without requiring any significant changes or modifications of the swivel base structure.

To attain the foregoing object, the present invention provides a lead wireguide structure for an industrial robot having a fixed base, a swivel base movably mounted on said fixed base with a bottom and a space therein, and an arm attached to said swivel base with its lower section being rotatably held therein, characterized in that a partition wall plate is provided on the upper bottom surface of said swivel base at a position offset toward the outer periphery thereof from a position of said arm within said space, that a lead wire penetration section is defined in said partition wall plate at a higher position than the upper bottom, and that a lead wire penetration hole is further provided at a position outward from said partition wall plate of said bottom section for causing lead wires drawn out of the lower section of said arm in said space to extend downward to a position being positionally identical to or lower than the lead wire penetration section of said partition wall plate, while allowing the lead wires to be separated from each other to extend upward or horizontally so that a resulting lead wire portion passes through the lead wire penetration hole to enter the inside of said fixed base.

The aforesaid means advantageously serve to force any drip of water as transferred from the inside of the arm along the bundle of lead wires to naturally begin dropping down, due to gravity, at the lowest portion of the lead wires thus eliminating any further flow or "invasion" of the water into the interior of the fixed base.

According to the present invention as described above, it becomes possible to simply and reliably accomplish enhanced drip protection without the need of any significant structural changes or modifications of the swivel base.

[BEST MODE FOR CARRYING OUT THE INVENTION]

Figure 1:
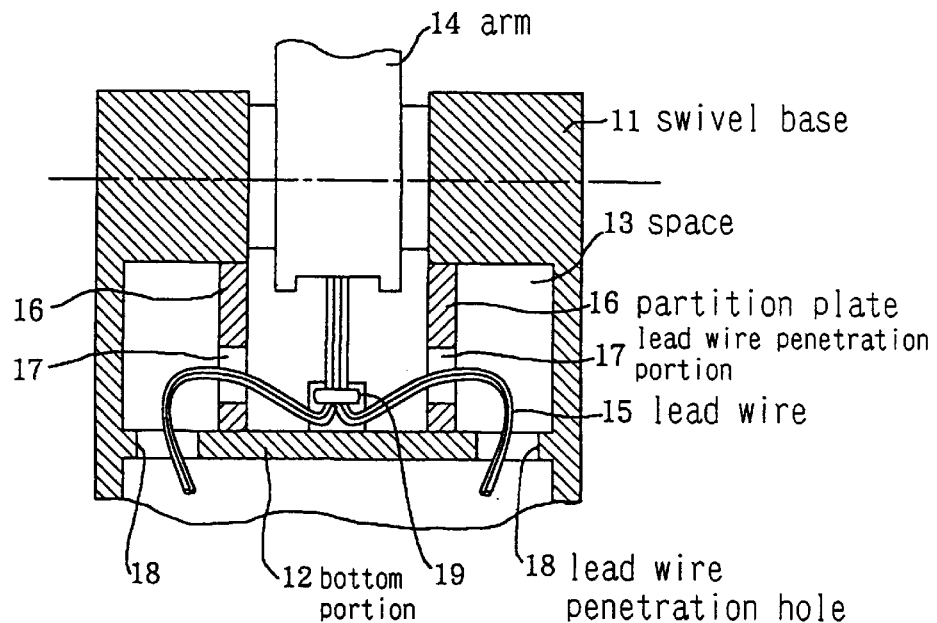
FIG. 1 is a diagram showing a principal cross-section of a swivel base section of one embodiment of the present invention.
Figure 2:
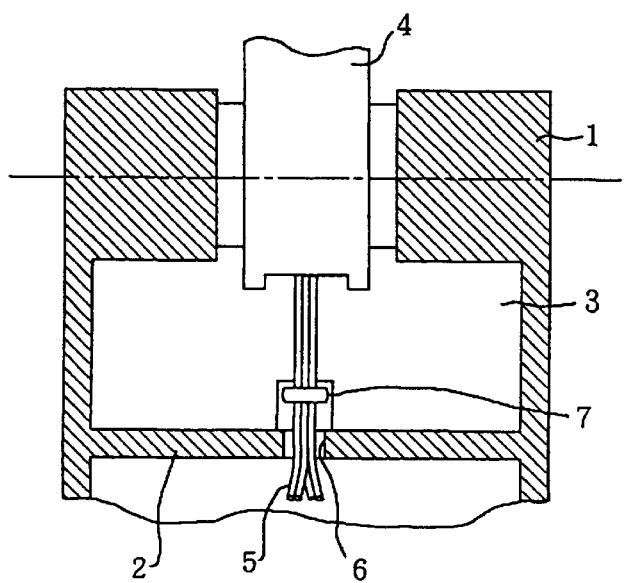
FIG. 2 illustrates a corresponding cross-sectional view of a swivel base section in the prior art.

One preferred embodiment of the invention will now be described with reference to the accompanying drawing. FIG. 1 shows a principal cross-sectional view of a lead wire guide structure for use in industrial robots in accordance with the principle of the invention.

In this drawing, the numeral 11 indicates a swivel base which is swivelably mounted on a fixed base 10, and which has a bottom section 12 defining a space 13 therein. Numeral 14 designates an arm rotatably attached at its lower section to said swivel base; this arm 14 comes with a plurality of lead wires 15 of driver or actuator motors for other arms or a wrist not shown, said wires being externally drawn out of the lower section of arm 14 as shown. Numeral 16 denotes a pair of separated partition wall plates standing on bottom section 12 of said swivel base 11 in such a manner that these are disposed at positions outward from arm 14 within said space 13. Partition plates 16 have openings serving as lead wire penetration sections 17 that are higher than the upper surface of said bottom section 12, with arm 14 being centrally disposed therebetween. Numeral 18 shows a pair of lead wire penetration holes as defined in bottom section 12, such that these holes 18 are at outward positions from partition plates 16.

Lead wires 15, which are drawn out of the lower section of arm 14 within space 13, are made to go down toward a selected position below lead wire penetration sections 17 of said partition plates 16; thereafter, lead wires 15 are split into two separate portions, each of which are bent upward temporarily to extend laterally in opposite directions over bottom section 12, then finally entering the inside of said fixed base 10 through lead wire penetration holes 18.

With such an arrangement, any water which has run along the bundle of lead wires 15 from the interior of arm 14 will naturally drop off at the lowest portion of temporarily upward-bent lead wires; accordingly, no drips will progress along the lead wires to enter the interior of the fixed base 10.

It should be noted that in the illustrative embodiment, lead wire penetration holes 18 are defined on both sides of partition wall plates 16, with arm 14 being interposed therebetween. However, this may alternatively be modified so that a hole is provided on one side only. In this case, the bundle of lead wires 15 will no longer be subdivided into two separate portions; the wire bundle will be integrally extended to enter such one lead wire penetration hole 18.

Still alternatively, lead wires 15 drawn out of arm 14 at the lower section thereof within said space 13 may be arranged so that, after they are forced to extend in the same direction as lead wire penetration sections 17, these wires are then split into two separate portions which are guided to enter the interior of said fixed base 10 by way of lead wire penetration holes 18.

Furthermore, it will be also permissible for the structure to be arranged so that lead wire penetration sections 17 defined in partition wall plates 16 are constituted from any possible gap-like spaces as defined by the entire cut-off of the upper sections of partition plates 16, rather than holes or openings.

[INDUSTRIAL APPLICABILITY]

The present invention can be applied to the field of industrial robots with drip-proofing protection of lead wires of the swivel base section thereof.

We claim:

1. A structure for lead wire distribution in an industrial robot having a fixed base, a swivel base movably mounted on said fixed base, said swivel base having a bottom and a space therein, said bottom of said swivel base having an upper bottom surface, an arm attached to said swivel base with the lower section of said arm being rotatably held in said swivel base, a partition plate provided in said space and disposed on said upper bottom surface of said swivel base at a position offset from an outer periphery of said upper bottom surface and offset from said arm within said space, a lead wire penetration portion in said partition plate at a level above said upper bottom surface, and a lead wire penetration hole provided in said bottom of said swivel base at a position outward from said partition plate for permitting lead wires drawn out of the lower section of said arm in said space to extend downwardly toward a position identical to or lower than said lead wire penetration section of said partition plate, while allowing said lead wires to be separated from each other to extend upwardly or horizontally so that a resulting lead wire portion passes through said lead wire penetration portion, enters into the outer periphery of said partition plate and passes through said lead wire penetration hole to enter the inside of said fixed base.

2. A structure for lead wire distribution in an industrial robot having a fixed base, a swivel base movably mounted on said fixed base, said swivel base having a bottom and a space therein, said bottom of said swivel base having an upper bottom surface, an arm attached to said swivel base with the lower section of said arm being rotatably held in said swivel base, a partition plate provided in said space and disposed on said upper bottom surface of said swivel base at a position offset from an outer periphery of said upper bottom surface and offset from said arm within said space, a lead wire penetration portion in said partition plate at a level above said upper bottom surface, and a lead wire penetration hole provided in said bottom of said swivel base at a position outward from said partition plate permitting lead wires drawn out of the lower section of said arm in said space to extend downwardly toward a position identical to or lower than said lead wire penetration section of said partition plate, while allowing said lead wires to extend upwardly or horizontally so that a resulting lead wire portion passes through said lead wire penetration portion, enters into the outer periphery of said partition plate and passes through said lead wire penetration hole to enter the inside of said fixed base.

* * * * *